United States Patent
Edlund et al.

(10) Patent No.: US 9,602,607 B2
(45) Date of Patent: Mar. 21, 2017

(54) QUERY-DRIVEN VIRTUAL SOCIAL NETWORK GROUP

(71) Applicant: International Business Machines Corporation, Armonk, NY (US)

(72) Inventors: Stefan B. Edlund, San Jose, CA (US); Kun Hu, San Jose, CA (US); James H. Kaufman, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 671 days.

(21) Appl. No.: 13/891,723

(22) Filed: May 10, 2013

(65) Prior Publication Data

US 2014/0337421 A1 Nov. 13, 2014

(51) Int. Cl.
| | | |
|---|---|---|
| G06F 15/16 | (2006.01) | |
| H04L 29/08 | (2006.01) | |
| G06F 17/30 | (2006.01) | |
| H04W 4/08 | (2009.01) | |
| H04W 4/20 | (2009.01) | |

(52) U.S. Cl.
CPC ............ *H04L 67/22* (2013.01); *G06F 17/30* (2013.01); *H04W 4/08* (2013.01); *H04W 4/206* (2013.01)

(58) Field of Classification Search
CPC ....... H04L 51/32; H04L 65/403; H04L 67/22; H04W 4/08; H04W 4/206; G06F 17/30
USPC ................ 709/202–205, 217–219, 227–228; 707/713, 721–722
See application file for complete search history.

(56) References Cited

U.S. PATENT DOCUMENTS

| | | |
|---|---|---|
| 7,031,961 B2 | 4/2006 | Pitkow et al. |
| 7,177,904 B1 | 2/2007 | Mathur et al. |
| 8,019,743 B2 | 9/2011 | Ebanks |
| 8,239,364 B2 | 8/2012 | Wable et al. |
| 9,268,857 B2* | 2/2016 | Johnson ............ G06F 17/30867 |
| 9,299,059 B1* | 3/2016 | Marra ............... G06F 17/30864 |

(Continued)

FOREIGN PATENT DOCUMENTS

WO 2012027877 A1 3/2012

OTHER PUBLICATIONS

IP.com; A System and Method to Use Social Network Data and Travel Events Data to Co-ordinate Travel Plans with Friends and Realtives; Sep. 4, 2012; pp. 1-2.

(Continued)

*Primary Examiner* — Bharat N Barot
(74) *Attorney, Agent, or Firm* — Cantor Colburn LLP

(57) ABSTRACT

Embodiments relate to implementing a query-driven virtual social media network group. An aspect includes providing, through a social media network, a search function option incorporated into a user interface that is configured for access by a user of the social media network. Another aspect includes receiving, at the social media network, a query from the user through the search function option of the user interface and searching a database of user profiles and content history for information that satisfies the query. The user profiles and the content history include content received from users as members of the social media network. A further aspect includes creating a virtual social media network group from results of the searching and providing access to a view of the virtual social media network group via the user interface for the user.

20 Claims, 4 Drawing Sheets

(56) References Cited

U.S. PATENT DOCUMENTS

| | | | |
|---|---|---|---|
| 2004/0162830 A1* | 8/2004 | Shirwadkar | G06F 17/3087 707/999.01 |
| 2009/0215469 A1* | 8/2009 | Fisher | H04L 12/588 455/456.3 |
| 2010/0125798 A1 | 5/2010 | Brookhart | |
| 2011/0196923 A1 | 8/2011 | Marcucci et al. | |
| 2011/0314048 A1 | 12/2011 | Ickman et al. | |
| 2012/0005201 A1 | 1/2012 | Ebanks | |
| 2012/0036148 A1 | 2/2012 | Jain et al. | |
| 2012/0066202 A1 | 3/2012 | Hatazawa et al. | |
| 2012/0158715 A1 | 6/2012 | Maghoul et al. | |
| 2012/0210240 A1 | 8/2012 | Neystadt et al. | |
| 2013/0073389 A1* | 3/2013 | Heath | G06Q 50/01 709/204 |
| 2013/0275413 A1* | 10/2013 | Snir | G06F 17/30554 707/722 |
| 2015/0006639 A1* | 1/2015 | Huston | G06Q 30/0207 709/204 |
| 2015/0213096 A1* | 7/2015 | Montgomery | G06F 17/30554 707/722 |
| 2016/0162172 A1* | 6/2016 | Rathod | H04L 67/10 715/747 |

OTHER PUBLICATIONS

IP.com; Social Network Based Attire Recommendation; Sep. 26, 2012. pp. 1-3.

* cited by examiner

QUERY-DRIVEN VIRTUAL SOCIAL NETWORK GROUP

BACKGROUND

The present disclosure relates generally to social media, and more specifically, to implementing a query-driven virtual social media network group.

Electronic communications devices are commonly used to generate, acquire, and share information over one or more networks. Many communications service providers offer different types of electronic communication services, such as electronic mail, instant messaging, text messaging, and subscription-based blogging, to name a few.

There are increasing numbers of individuals who are now utilizing social networks in order to communicate with others. Some of these networks are geared toward specific individuals or environments. For example, some websites are created for people in professional occupations, while other websites are created for college students.

BRIEF SUMMARY

Embodiments include a method and computer program product for implementing a query-driven virtual social media network group.

A method includes providing, through a social media network, a search function option incorporated into a user interface that is configured for access by a user of the social media network. The method also includes receiving, at the social media network, a query from the user through the search function option of the user interface and searching a database of user profiles and content history for information that satisfies the query. The user profiles and the content history include content received from users as members of the social media network. The method further includes creating a virtual social media network group from results of the searching, and providing access to a view of the virtual social media network group via the user interface for the user.

A computer program product includes a computer readable storage medium having program code embodied therewith. The program code is executable by a computer to provide, through a social media network, a search function option incorporated into a user interface that is configured for access by a user of the social media network. The program code is executable by the computer to also receive, at the social media network, a query from the user through the search function option of the user interface and search a database of user profiles and content history for information that satisfies the query. The user profiles and the content history include content received from users as members of the social media network. The program code is further executable by the computer to create a virtual social media network group from results of the searching and provide access to a view of the virtual social media network group via the user interface for the user.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Embodiments described herein are directed to implementing virtual social media network groups via a social media network tool. The social media network tool provides a means for users of a social media network to query user histories and generates virtual social media network groups from results of the search queries, which virtual social media network groups are presented to the users in an organized way. The virtual social media network groups include user-generated content and are dynamically created in response to these search queries. Different views of the virtual social media network groups can be provided to selected users using a filtering option.

Figure 1:
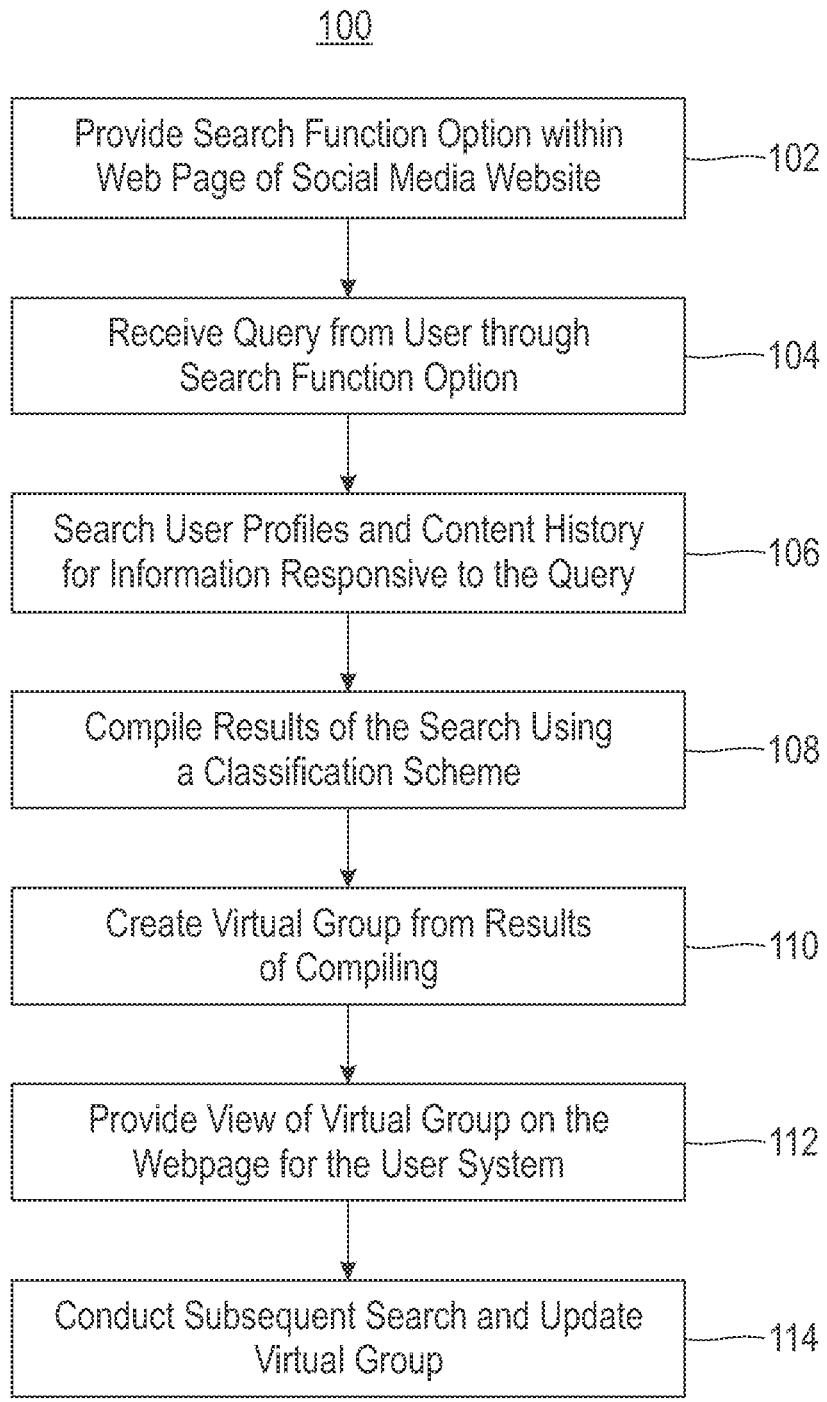
FIG. 1 depicts a flow diagram of a process for implementing a query-driven virtual social media network group in accordance with an embodiment.

Turning now to FIG. 1, a flow diagram of a process 100 in accordance with an embodiment is generally shown. The process 100 of FIG. 1 assumes that a user of a communications device (also referred to herein as "user system") has established an account or completed a registration process with a provider of the social media network tool. The process 100 further assumes that the user is currently active at a social media network of the provider (e.g., signed in to his/her personal web page). The provider's network may be configured to enable the user to set privacy permissions through an access control element at the social media network, such that access to the user's information may be limited to users of the social media network who have been authorized by the user. These users who are authorized to access the user's information are referred to a "community."

Figure 2:
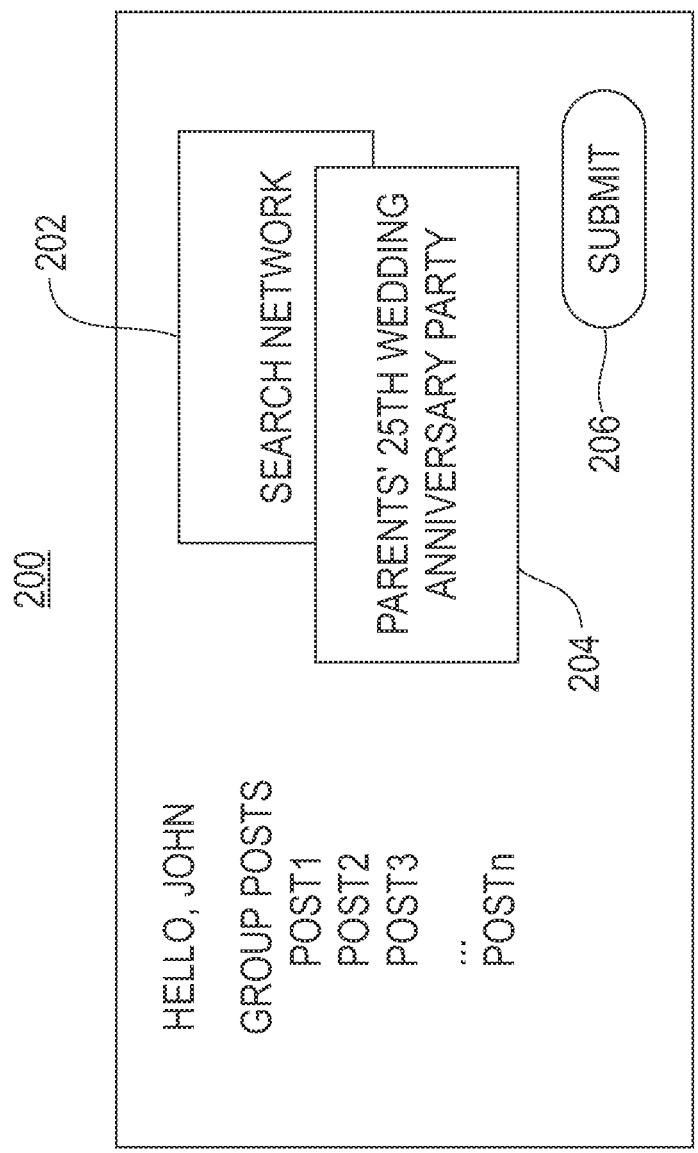
FIG. 2 depicts a user interface screen of a social media network page for initiating a search by a user of the social media network in accordance with an embodiment.

As shown in FIG. 2, by way of non-limiting illustration, a user interface screen 200 provides personalized content (e.g., via a web page) that is specific to the user. For instance, the user interface screen 200 may include messages, photographs, multimedia files, and the like, which have been posted by the user and also by other users of the social media network who have a relationship with the user (e.g., two users who have accepted each other's 'friend' requests via the social media network). The content may also include hypertext links to sources of information, as well as tagged files. The content created by the user and the user's mutual friends and/or the content may be shared by friends from other sources and posted on the user's page. Collectively, the content posted by a community of users have a relationship with the user is referred to herein as a "social media network group." In addition to the content posted by the community of users, the user may also establish a user profile through the social media network in order to provide personal information about the user. For example, the user may provide a name, city/state or location of residence, occupation, employer, education background, gender, and the like.

This information may be stored by the social media network provider in the user profile. Likewise, a user profile may be generated to each member or user of the social media network.

At block 102, the social media network tool provides to the user system, through a website or other means, a search function option incorporated into user interface or page that is generated for access by the user of the user system. As shown in the user interface screen 200 of FIG. 2, a search function option 202 is provided on the user's page.

At block 104, the social media network tool receives at the social media network, a query from the user through the search function option of the page. For purposes of illustration, suppose that the user is in the beginning stages of planning a $30^{th}$ wedding anniversary celebration for her parents. Suppose, also, that the user previously held a $25^{th}$ wedding anniversary for her parents, and many of those who attended the gathering are friends with the user through corresponding network accounts with the social media network. The user would like to gather information from the network community that may be helpful in planning the $30^{th}$ wedding anniversary celebration. As shown, for example, in FIG. 2, the user has entered a query "parents' $25^{th}$ wedding anniversary" in a query box 204 provided by the tool. Once the query has been entered, the user selects a submit option 206 on the page, and the query is transmitted to the provider of the social media network tool.

At block 106, the social media network tool searches one or more databases of user profiles and content history for information that is responsive to, or satisfies, the user's query. In one embodiment, the search may be directed to only those user profiles and content history associated with the user's community (e.g., users authorized by the user to access information about the user through the network). Using the examples of content described above, the tool may search message posts, shared content (including links to other sources), tagged files (e.g., photographs, multimedia files, etc.), and the like. The message posts may provide useful information regarding, e.g., opinions, suggestions, compliments, and/or complaints concerning the previously held event, such that the user may avoid any pitfalls or enhance the guests' experiences for the new event. Likewise, photographs and video files posted of the event may result from the search and may provide visual information that is useful in the planning of the new event (e.g., lighting at the venue needs improvement or decorations used were a huge hit with the guests).

In another embodiment, in addition to searching the user profiles and content history of the user's community, the social media network tool may be configured to search all publicly available information in the social media network. In this embodiment, the search results may provide useful information concerning other similar events held by members of the social media network who are outside of the user's community. For privacy reasons, the identities of the users may be withheld from the search results.

In a further embodiment, the social media network tool may be configured to select particular user profiles and corresponding content histories of users in the network (e.g., in the user's community and/or outside of the user's community) for the search. The social media network tool may select user profiles having common features with the features associated with the user's profile. For example, the social media network tool may search user profiles for users having a residency in proximity to the user, and/or may search user profiles for users with similar educational or professional backgrounds. For privacy reasons, the identities of the users may be withheld from the search results. Alternatively, the identities of the users may be included in the results if the users have permitted access to this information (e.g., through an access control element provided by the social media network provider).

Returning now to FIG. 1, the social media network tool compiles the results of the searching using a classification scheme at block 108. The classification scheme may be implemented using various techniques. For example, if the results of the search are voluminous, the social media network tool may classify the results into categories or subjects. Using the anniversary celebration example above, sample categories may include food, accommodations, decorations, activities, gifts/party favors, pictures/video, and guest list. The results may be organized in chronological order (e.g., date/time of message post or receipt by the network) or other desired ordering technique. In another embodiment, the results may be organized by author/originator or content poster.

Figure 3:
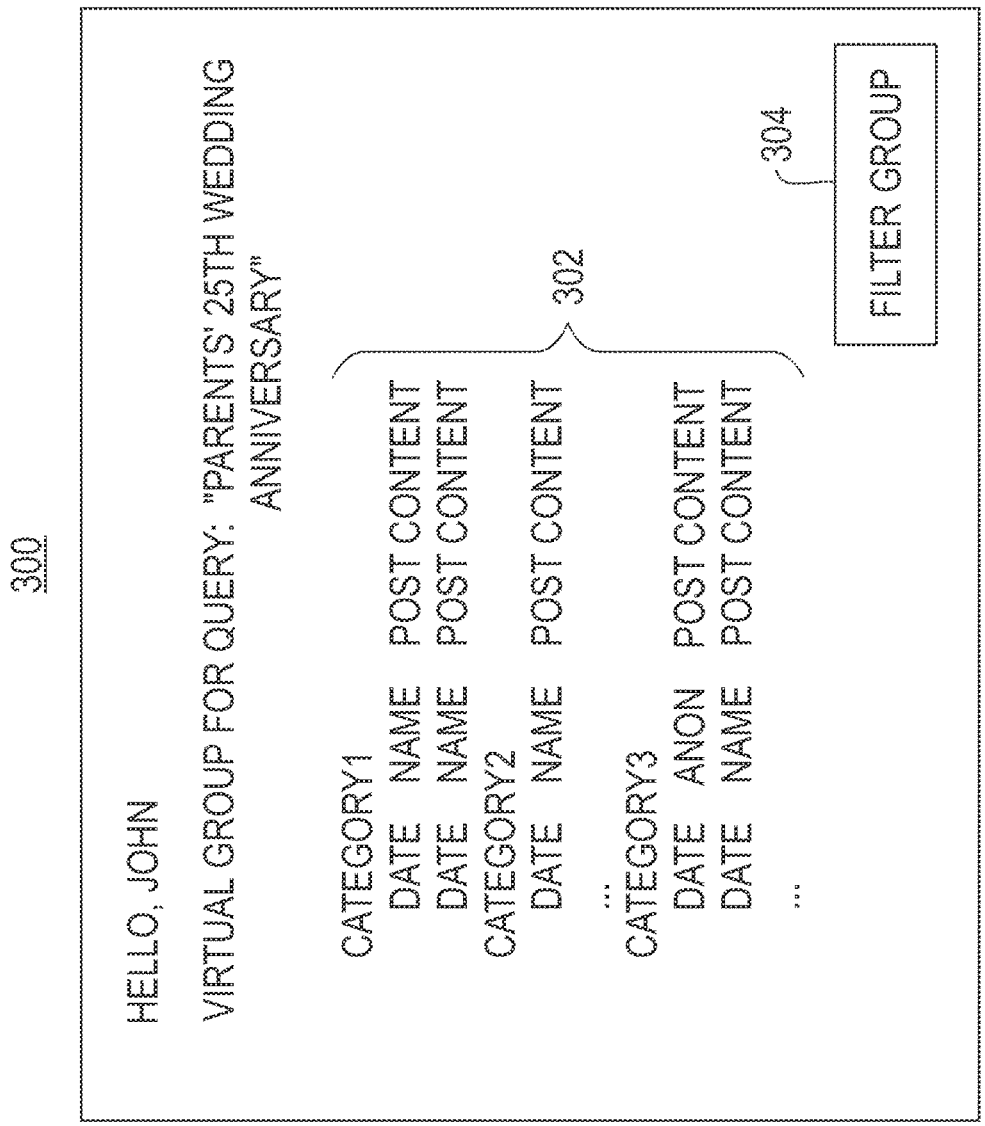
FIG. 3 depicts a user interface screen of a virtual social media network group generated from search results in accordance with an embodiment.

At block 110, the social media network tool creates a dynamic virtual social media network group from results of the compiling. The virtual social media network group represents a compilation of the search results presented in an organized way. It is dynamic in the sense that its elements do not exist as a collection until the search and compilation are complete. It is also dynamic in that it is changeable as new information is derived, as will be described further herein. At block 112, the social media network tool presents the virtual social media network group on the user's page. As shown in FIG. 3, for example, a user interface screen 300 illustrates a view of a virtual social media network group 302 for the user, in which the search results have been classified, by way of non-limiting example, by category and date of posting within each category.

As indicated above, the social media network tool may be configured with an access control element that enables the user to restrict access to his/her personal information. In addition, the access control element may be configured to enable the user to filter search results contained in the virtual social media network group, such that different users of the virtual social media network group may have different views of the group. For example, one of the users may be restricted from viewing the virtual social media network group, while another of the users may be restricted from viewing selected content in the group. As shown in FIG. 3, for example, a filter option 304 may be selected by the user for initiating these access control features.

In an embodiment, the social media network tool may be configured to enable the user to save the virtual social media network group. In this embodiment, the virtual social media network group is persistent as long as the user desires. In addition, the social media network tool may be configured to continuously or periodically search the user profiles and content histories with respect to the query in order to dynamically update the virtual social media network group with new or modified content. In this embodiment, a new view of the virtual social media network group is created and provided to the user at step 114. In another embodiment, the social media network group may be removed from the social media network after a defined period of time or upon request by the user.

In a further embodiment, the social media network tool may be configured to provide an option, via the user's page, for the user to respond to an originator of content who is in the virtual social media network group. For example, the user may select a hypertext link to the originator's name or other linked item (e.g., if the originator is outside of the user's community and no name is provided in the social media network group), and a window is presented for entering text. In addition, if the subject of the query is an event, the social media network tool may be configured to provide an option for the user to send an invitation to users in the virtual social media network group.

Figure 4:
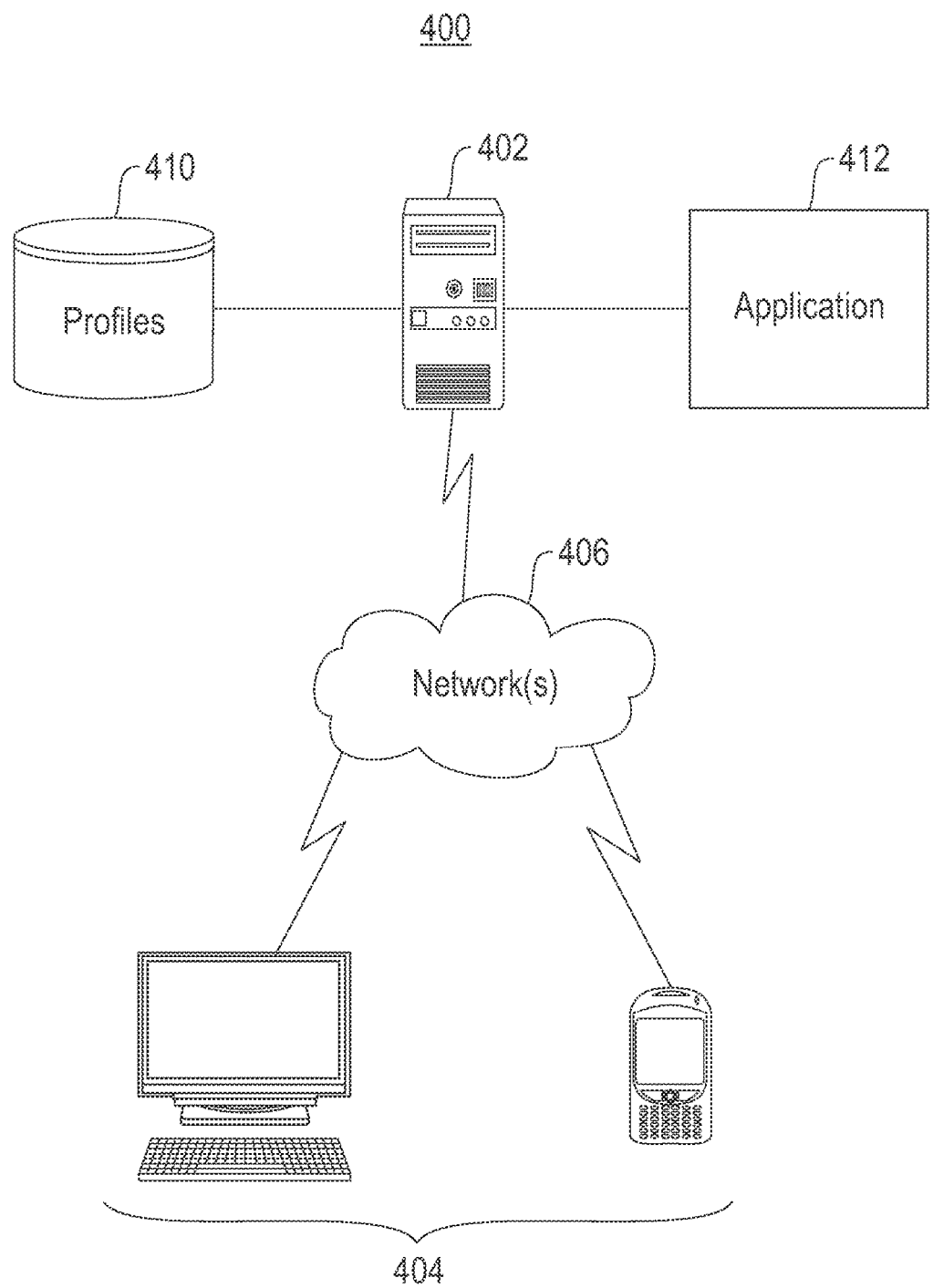
FIG. 4 depicts a system upon which the query-driven virtual social media network group may be implemented in accordance with an embodiment.

Turning now to FIG. 4, a system 400 upon which the virtual social media network groups may be implemented in an embodiment will now be described.

The system 400 includes a host system computer 402 and communications devices 404 (also referred to as user systems) communicatively coupled to one or more network(s) 406. The host system computer 402 may be implemented as one or more high-speed computer processing devices, such as one or more mainframe computers or servers capable of handling a high volume of computing activities conducted by end users of the social media network tool. The host system computer 402 may operate as a database server and coordinate access to application data including data stored on a storage device 410. The storage device 410 may be implemented using memory contained in the host system computer 402 or may be a separate physical device. In an embodiment, the storage device 410 stores user profiles and content histories of users of the social media network.

The host system computer 402 may be implemented using one or more servers operating in response to a computer program stored in a storage medium accessible by the server. The host system computer 402 may also operate as a network server (e.g., a web server) to communicate with the communications devices 404, as well as any other network entities. In an embodiment, the host system computer 402 may represent a node in a cloud computing environment or may be configured to operate in a client/server architecture.

The communications devices 404 may be any type of devices with computer processing capabilities. For example, the communications devices 404 may include a combination of general-purpose computers (e.g., desktop, lap top), host-attached terminals (e.g., thin clients), and portable communication devices (e.g., smart phones, personal digital assistants, and tablet PCs). The communications devices 404 may be wired or wireless devices. In an embodiment, the communications devices 404 may represent cloud consumers in a cloud computing environment.

In an embodiment, the communications devices 404 may be implemented by end users of a social media network or web service hosted by an entity or enterprise operating the host system computer 402. The communications devices 404 may each execute a web browser for accessing network entities, such as the host system computer 402. In an embodiment, the communications devices 404 access a web site of the host system computer 402 for browsing and accessing an application 412. The application 412 implements the social media network tool described herein.

The network(s) 406 may be any type of known networks including, but not limited to, a wide area network (WAN), a local area network (LAN), a global network (e.g. Internet), a virtual private network (VPN), and an intranet. The network(s) 406 may be implemented using a wireless network or any kind of physical network implementation known in the art, e.g., using cellular, satellite, and/or terrestrial network technologies.

Technical effects and benefits include providing a way to query histories in a social media network and generate virtual groups from results of the search queries, which virtual groups are then presented in an organized way. The virtual groups include user-generated content and are dynamically created in response to the search queries. Different views of the virtual groups can be provided to selected users using a filtering option.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
providing, at a social media network, a search function option incorporated into a user interface of the social media network that is configured for access by a user of the social media network;
receiving, at the social media network, a query from the user through the search function option of the user interface;
searching a database of content history corresponding to content posted by members of the social media network, and searching user profiles of the members of the social media network for information that satisfies the query;
searching the user profiles for features of corresponding users that are common to features in a user profile of the user initiating the query, the features including characteristics of the users;
creating a virtual social media network group from results of the searching, the virtual social media network group including at least one member sharing a common feature with the user and at least one member whose content history satisfies the query; and
providing access to a view of the virtual social media network group via the user interface for the user.

2. The method of claim 1, wherein at least one of the members is within a community that is defined by the user via an access control element of the social media network, and the providing access to the view of the virtual social media network group via the user interface includes presenting, subject to verification by the access control element, an identity of an originator of content posted and selected for inclusion in the virtual social media network group based on the results of the searching.

3. The method of claim 1, wherein at least one of the members is outside of a community that is defined by the user via an access control element of the social media network, and the providing access to the view of virtual social media network group via the user interface includes excluding, as a result of verification by the access control element, an identity of an originator of content posted and selected for inclusion in the virtual social media network group based on the results of the searching.

4. The method of claim 1, further comprising:
providing, to the user through the social media network, an access control element option configured for access by the user;
receiving, from the user, access control settings for the virtual social media network group via the access control element option, the access control settings defining access permissions for the virtual social media network group; and providing access to another view of the virtual social media network group, that is different from the view of the virtual social media network group, to at least one of the members based on application of the access control settings to the results of the searching.

5. The method of claim 1, wherein the content is received as posts to the social media network by the members, the content including at least one of a message, a text file, an audio file, an image file, and a multimedia file.

6. The method of claim 1, wherein the results of the searching include content derived from file tags and hypertext links associated with the user profiles and the content history.

7. The method of claim 1, wherein the virtual social media network group is persistent with respect to a user profile of the user, the method further comprising:

performing, at a second time interval, a second search of the database using the query; and creating a new view of the virtual social media network group, at the second time interval, including updates rendered from results of the second search.

8. The method of claim 1, wherein the virtual social media network group is removed from the social media network upon at least one of an expiration of a defined period of time and a request from the user.

9. The method of claim 1, further comprising:

providing an option, via the user interface, for the user to respond to an originator of the content that is provided in the virtual social media network group.

10. The method of claim 1, further comprising compiling results of the searching using a classification scheme, the classification scheme including organizing the results of the searching by at least one of subject matter, date of receipt, and originator.

11. The method of claim 1, wherein the query is directed to an event, the method further comprising:

providing, to the user via the social media network, an option configured to generate an invitation for the event to users identified in the virtual social media network group, the invitation distributed to the users identified in the virtual social media network group via the social media network.

12. A computer program product, comprising:

a non-transitory computer readable storage medium having program code embodied therewith, the program code executable by a computer to implement:

providing, at a social media network, a search function option incorporated into a user interface of the social media network that is configured for access by a user of the social media network;

receiving, at the social media network, a query from the user through the search function option of the user interface;

searching a database of content history corresponding to content posted by members of the social media network, and searching user profiles of the members of the social media network for information that satisfies the query;

searching the user profiles for features of corresponding users that are common to features in a user profile of the user initiating the query, the features including characteristics of the users;

creating a virtual social media network group from results of the searching, the virtual social media network group including at least one member sharing a common feature with the user and at least one member whose content history satisfies the query; and providing access to a view of the virtual social media network group via the user interface for the user.

13. The computer program product of claim 12, wherein at least one of the members is within a community that is defined by the user via an access control element of the social media network, and the providing access to the view of the virtual social media network group via the user interface includes presenting, subject to verification by the access control element, an identity of an originator of content posted and selected for inclusion in the virtual social media network group based on the results of the searching.

14. The computer program product of claim 12, wherein at least one of the members is outside of a community that is defined by the user via an access control element of the social media network, and the providing access to the view of virtual social media network group via the user interface includes excluding, as a result of verification by the access control element, an identity of an originator of the content posted and selected for inclusion in the virtual social media network group based on the results of the searching.

15. The computer program product of claim 12, wherein the program code executable by the computer further implements:

providing, to the user through the social media network, an access control element option configured for access by the user;

receiving, from the user, access control settings for the virtual social media network group via the access control element option, the access control settings defining access permissions for the virtual social media network group; and providing access to another view of the virtual social media network group, that is different from the view of the virtual social media network group, to at least one of the members based on application of the access control settings to the results of the searching.

16. The computer program product of claim 12, wherein the content is received as posts to the social media network by the members, the content including at least one of a message, a text file, an audio file, an image file, and a multimedia file.

17. The computer program product of claim 12, wherein the results of the searching include content derived from file tags and hypertext links associated with the user profiles and the content history.

18. The computer program product of claim 12, wherein the virtual social media network group is persistent with respect to a user profile of the user, the program code executable by the computer further implementing:

performing, at a second time interval, a second search of the database using the query; and creating a new view of the virtual social media network group, at the second time interval, including updates rendered from results of the second search.

19. The computer program product of claim 12, wherein the virtual social media network group is removed from the social media network upon at least one of an expiration of a defined period of time and a request from the user.

20. The computer program product of claim 12, wherein the program code executable by the computer further implements:

providing an option, via the user interface, for the user to respond to an originator of the content that is provided in the virtual social media network group.

\* \* \* \* \*